United States Patent
Abelovski et al.

(10) Patent No.: US 11,155,726 B2
(45) Date of Patent: *Oct. 26, 2021

(54) INKJET INK(S)

(71) Applicant: Hewlett-Packard Development Company, L.P., Spring, TX (US)

(72) Inventors: Benjamin Abelovski, San Diego, CA (US); Ryan Vu, San Diego, CA (US); Jie Zheng, San Diego, CA (US); Dennis Guo, San Diego, CA (US); George Sarkisian, San Diego, CA (US); Tienteh Chen, San Diego, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 246 days.

This patent is subject to a terminal disclaimer.

(21) Appl. No.: 16/462,416

(22) PCT Filed: Mar. 27, 2017

(86) PCT No.: PCT/US2017/024337
§ 371 (c)(1),
(2) Date: May 20, 2019

(87) PCT Pub. No.: WO2018/182568
PCT Pub. Date: Oct. 4, 2018

(65) Prior Publication Data
US 2019/0367756 A1 Dec. 5, 2019

(51) Int. Cl.
*C09D 11/322* (2014.01)
*C08G 18/08* (2006.01)
*C08G 18/32* (2006.01)
*C08G 18/34* (2006.01)
*C08G 18/42* (2006.01)
*C08G 18/75* (2006.01)
*C08G 71/04* (2006.01)
*C08L 75/04* (2006.01)
*C09D 11/36* (2014.01)
*C09D 11/40* (2014.01)

(52) U.S. Cl.
CPC ........ *C09D 11/322* (2013.01); *C08G 18/0828* (2013.01); *C08G 18/3206* (2013.01); *C08G 18/348* (2013.01); *C08G 18/4255* (2013.01); *C08G 18/755* (2013.01); *C08G 71/04* (2013.01); *C08L 75/04* (2013.01); *C09D 11/36* (2013.01); *C09D 11/40* (2013.01)

(58) Field of Classification Search
CPC ....... C09D 11/322; C09D 11/36; C09D 11/40; C09D 11/102; C09D 11/106; C08G 18/0828; C08G 18/3206; C08G 18/348; C08G 18/4255; C08G 18/755; C08G 71/04; C08G 18/4825; C08G 18/6245; C08G 18/6685; C08G 18/2081; C08G 18/227; C08G 18/246; C08G 18/3857; C08G 18/4063; C08L 75/04
See application file for complete search history.

(56) References Cited

U.S. PATENT DOCUMENTS

| | | | |
|---|---|---|---|
| 8,044,115 B2 | 10/2011 | Brust et al. | |
| 8,142,558 B2 | 3/2012 | Robertson et al. | |
| 8,500,266 B2 | 8/2013 | Roberts et al. | |
| 2004/0110865 A1 | 6/2004 | McCovick et al. | |
| 2007/0076073 A1 | 4/2007 | Hornby | |
| 2008/0207820 A1 | 8/2008 | Brust et al. | |
| 2009/0170986 A1* | 7/2009 | Brust | C09D 11/326 524/104 |
| 2009/0246377 A1 | 10/2009 | Robertson et al. | |
| 2013/0237661 A1 | 9/2013 | Brust et al. | |
| 2013/0307914 A1* | 11/2013 | Chen | C09D 11/40 347/100 |
| 2014/0300673 A1* | 10/2014 | Prasad | C09D 11/54 347/100 |
| 2018/0016384 A1* | 1/2018 | Chen | C08G 18/348 |
| 2018/0179325 A1* | 6/2018 | Chen | C08G 18/3215 |
| 2019/0270899 A1* | 9/2019 | Chen | C08G 18/348 |
| 2019/0322887 A1* | 10/2019 | Guo | C09D 11/322 |

FOREIGN PATENT DOCUMENTS

| | | | | |
|---|---|---|---|---|
| CN | 105625056 | | 6/2016 | |
| WO | 2005080513 | | 9/2005 | |
| WO | 2008106146 | | 9/2008 | |
| WO | 2012105949 | | 8/2012 | |
| WO | 2015187144 | | 12/2015 | |
| WO | 2016122563 | | 8/2016 | |
| WO | 2016122569 | | 8/2016 | |
| WO | WO-2017074349 | * | 5/2017 | ............ C09D 11/03 |
| WO | WO-2017074349 A1 | * | 5/2017 | ............ C09D 11/03 |
| WO | 2018156157 | | 8/2018 | |

OTHER PUBLICATIONS

International Search Report dated Nov. 30, 2017 for PCT/US2017/024337, Applicant Hewlett-Packard Development Company, L.P.

* cited by examiner

*Primary Examiner* — Alexander C Kollias
(74) *Attorney, Agent, or Firm* — HP Inc. Patent Department

(57) ABSTRACT

Inkjet inks are described herein. In an example, an inkjet ink can comprise: at least one colorant; at least one solvent comprising glycerol in an amount of from about 1 wt % to about 20 wt % based on the total weight of the inkjet ink; water; and at least one binder, wherein the binder comprises a polyurethane-based binder dispersion.

14 Claims, No Drawings

INKJET INK(S)

BACKGROUND

Inkjet printing is a popular printing technique for recording images on a variety of media, including plain paper and photo paper. Inkjet printers form ink droplets using heat or mechanical vibration. As an example, thermal inkjet printers include resistors that create heat, which vaporizes ink in an ink nozzle on a cartridge to create a bubble. As the bubble expands, some of the ink is pushed out of the ink nozzle and onto the medium. The ink used may include a colorant and some combination of ingredients to achieve target print quality and/or printer performance.

To generate full color prints using inkjet printing, ink sets having components of various colors and/or hues are used. Generally, ink sets having cyan, magenta, and yellow inks are utilized. In addition, a black ink is often added to enhance the printing of text and darker colors. Simple four-color systems like KCMY (black, cyan, magenta, and yellow) ink systems can offer economical solutions for color printing.

DETAILED DESCRIPTION

Black and cyan inks in the KCMY color systems can exhibit reduced ink stability and reduced pen life. In particular, sustained decap performance in black and cyan inkjet inks is not satisfactory. Therefore, there is a need for black and cyan inkjet inks that exhibit improved sustained decap performance.

The term "decap performance," as referred to herein, means the ability of the inkjet ink to readily eject from the printhead, upon prolonged exposure to air. The decap time is measured as the amount of time that a printhead may be left uncapped before the printer nozzles no longer fire properly, potentially because of clogging, plugging, or retraction of the colorant from the drop forming region of the nozzle/firing chamber. The length of time a thermal inkjet pen can remain unused and uncapped before spitting to form an acceptable quality ink drop is called decap time, or first drop decap time. Another decap metric is the number of spits to get the pen healthy at a specific time interval. The longest decap time that would give acceptable first drop quality or the fewest number of spits at any given decap time would be a targeted property for any given ink.

In some examples, inkjet ink compositions comprising at least one colorant comprising at least one colorant; at least one solvent comprising glycerol in an amount of from about 1 wt % to about 20 wt % based on the total weight of the inkjet ink composition; water; and at least one binder, are described. In some examples, the binder can comprise a polyurethane-based binder dispersion, which comprises water and a polyurethane.

In some examples, the polyurethane in the polyurethane-based binder dispersion can comprise: (A) a polyisocyanate, (B) a first polyol having a chain with two hydroxyl functional groups at one end of the chain and no hydroxyl groups at an opposed end of the chain, (C) a second polyol having a chain with two hydroxyl functional groups at both ends of the chain, (D) a carboxylic acid functional group with two hydroxyl functional groups, and (E) a sulfonate or sulfonic acid functional group having two amino functional groups. In some examples, the polyurethane in the polyurethane-based binder dispersion can further comprise: (F) a homopolymer or copolymer of poly(ethylene glycol) having one or two hydroxyl functional groups or one or two amino functional groups at one end of its chain.

These ink compositions can exhibit improved sustained decap performance.

Inkjet Ink Composition(s)

In some examples, inkjet ink compositions can comprise at least one colorant; at least one solvent comprising glycerol in an amount of from about 1 wt % to about 20 wt % based on the total weight of the inkjet ink composition; water; and at least one binder. In some examples, the binder can comprise a polyurethane-based binder dispersion, which can comprise water and a polyurethane.

In some examples, the polyurethane in the polyurethane-based binder dispersion can comprise: (A) a polyisocyanate, (B) a first polyol having a chain with two hydroxyl functional groups at one end of the chain and no hydroxyl groups at an opposed end of the chain, (C) a second polyol having a chain with two hydroxyl functional groups at both ends of the chain, (D) a carboxylic acid functional group with two hydroxyl functional groups, and (E) a sulfonate or sulfonic acid functional group having two amino functional groups. In some examples, the polyurethane in the polyurethane-based binder dispersion can further comprise: (F) a homopolymer or copolymer of poly(ethylene glycol) having one or two hydroxyl functional groups or one or two amino functional groups at one end of its chain.

Colorant(s)

The colorant(s) in the inkjet ink composition(s) described herein can include inorganic pigments, organic pigments, dyes, and combinations thereof.

The pigment may be any color, including, as examples, a cyan pigment, a magenta pigment, a yellow pigment, a black pigment, a violet pigment, a green pigment, a brown pigment, an orange pigment, a purple pigment, a white pigment, a metallic pigment (e.g., a gold pigment, a bronze pigment, a silver pigment, or a bronze pigment), a pearlescent pigment, or combinations thereof.

In some examples, the colorant is black and/or cyan. In some examples, the pigments are black and/or cyan.

In some examples, the colorant is black, cyan, and/or magenta. In some examples, the pigments are black, cyan, and/or magenta.

Examples of suitable yellow organic pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 77, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 122, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172, C.I. Pigment Yellow 180, and C.I. Pigment Yellow 185.

Examples of suitable blue or cyan organic pigments include C.I. Pigment Blue 1, C.I. Pigment Blue 2, C.I. Pigment Blue 3, C.I. Pigment Blue 15, Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Examples of suitable magenta, red, or violet organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Red 286, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Carbon black may be a suitable inorganic black pigment. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the BLACK PEARLS® series, REGAL® series, the MOGUL® series, or the MONARCH® series manufactured by Cabot Corporation, Boston, Mass., (such as, e.g., BLACK PEARLS® 880 Carbon Black, REGAL® 400R, REGAL® 330R, and REGAL® 660R); and various black pigments manufactured by Evonik Degussa Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). An example of an organic black pigment includes aniline black, such as C.I. Pigment Black 1.

Some examples of green organic pigments include C.I. Pigment Green 1, C.I. Pigment Green 2, C.I. Pigment Green 4, C.I. Pigment Green 7, C.I. Pigment Green 8, C.I. Pigment Green 10, C.I. Pigment Green 36, and C.I. Pigment Green 45.

Examples of brown organic pigments include C.I. Pigment Brown 1, C.I. Pigment Brown 5, C.I. Pigment Brown 22, C.I. Pigment Brown 23, C.I. Pigment Brown 25, C.I. Pigment Brown 41, and C.I. Pigment Brown 42.

Some examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

A suitable metallic pigment includes a metal chosen from gold, silver, platinum, nickel, chromium, tin, zinc, indium, titanium, copper, aluminum, and alloys of any of these metals. These metals may be used alone or in combination with two or more metals or metal alloys. Some examples of metallic pigments include STAN DART® R0100, STAN DART® R0200, and DORADO® gold-bronze pigments (available from Eckart Effect Pigments, Wesel, Germany).

In some examples, the above pigments can be used alone or in any combination with one another.

In some examples, the colorant is black and/or cyan. In some examples, the pigments are black and/or cyan.

In some examples, the colorant is black, cyan, and/or magenta. In some examples, the pigments are black, cyan, and/or magenta.

The total amount of the colorant(s) in the inkjet ink composition ranges from about 0.1 wt % to about 15 wt % based on the total weight of the inkjet ink composition. In some examples, the total amount of the colorant(s) in the inkjet ink composition ranges from about 1 wt % to about 8 wt % based on the total weight of the inkjet ink composition. The average particle size of these colorant(s) may range from about 80 nm to about 400 nm.

Colorant(s) in a Dispersion

In some examples, the above-described colorant(s) can be dispersed into a polymeric dispersion. In some examples, the colorant(s) (e.g., pigment(s)) can be dispersed in a dispersion comprising a styrene acrylic polymer. The polymeric dispersion comprising a styrene acrylic polymer can assist in dispersing the pigment in a solvent system.

A variety of styrene acrylic polymers can be used for the pigment dispersion. Some non-limiting commercial examples of useful styrene acrylic polymers are sold under the trade names JONCRYL® (S.C. Johnson Co.), UCAR™ (Dow Chemical Co.), JONREZ® (MeadWestvaco Corp.), and VANCRYL® (Air Products and Chemicals, Inc.).

In further detail, the styrene acrylic polymer can be formulated with a variety of monomers, such as hydrophilic monomers, hydrophobic monomers, or combinations thereof. Non-limiting examples of hydrophilic monomers that can be co-polymerized together to form the styrene acrylic polymer include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, the like, or combinations thereof.

Non-limiting examples of hydrophobic monomers that can be used include styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, ethoxylated nonyl phenol methacrylate, isobornyl methacrylate, cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, the like, or combinations thereof.

The styrene acrylic polymer can have a weight average molecular weight (Mw) from about 3,000 g/mol to about 30,000 g/mol. In yet other examples, the styrene acrylic polymer can have an Mw from about 4,000 g/mol to about 25,000 g/mol, or from about 4,500 g/mol to about 22,000 g/mol.

In each instance where molecular weight is referred to, it is to be understood that this refers to weight average molecular weight in g/mol.

Further, in some examples, the styrene acrylic polymer can have an acid number or acid value from about 120 mg KOH/g to about 300 mg KOH/g. In yet other examples, the styrene acrylic polymer can have an acid number from about 140 mg KOH/g to about 260 mg KOH/g, from about 160 mg KOH/g to about 240 mg KOH/g, or from about 180 mg KOH/g to about 230 mg KOH/g. An acid number can be defined as the number of milligrams of potassium hydroxide to neutralize 1 gram of the substance.

In some examples, the amount of styrene acrylic polymer in the inkjet ink composition can be from about 0.1 wt % to about 20 wt % based on the total weight of the inkjet ink composition, or from about 0.5 wt % to about 10 wt % based on the total weight of the inkjet ink composition, or from about 1 wt % to about 5 wt % based on the total weight of the inkjet ink composition.

In some examples, the amount of styrene acrylic polymer in the inkjet ink composition can be based on the amount of the colorant(s) in the inkjet ink composition. Thus, in some examples, the colorant(s) and the styrene acrylic polymer can be present in the inkjet ink composition at a particular weight ratio. In some specific examples, the pigment and styrene acrylic polymer can be present at a weight ratio of from 1:1 to 10:1. In other examples, the pigment and the styrene acrylic polymer can be present at a weight ratio of from about 2:1 to about 10:1. In yet other examples, the pigment and the styrene acrylic polymer can be present at a weight ratio of from about 3:1 to about 6:1.

Binder(s)

In some examples, the ink composition can include at least one binder. In some examples, this binder can be a part of the polymeric dispersion described above and/or added to the solvent system directly.

In some examples, the binder can comprise a polyurethane polymer, which can improve the durability of the ink composition. In some examples, the polyurethane polymer can act as a binder to help bind the pigment particles together.

In some examples, the polyurethane can be a reaction product of a polyisocyanate having at least two isocyanate (—NCO) functionalities per molecule with, at least, one isocyanate-reactive group, such as a polyol, having at least two hydroxy groups or an amine. Suitable polyisocyanates can include diisocyanate monomers and oligomers.

In some examples, the polyurethane can be a vinyl-urethane hybrid polymer or an acrylic-urethane hybrid polymer. In still other examples, the polyurethane can be an aliphatic polyurethane-acrylic hybrid polymer.

In some examples, the polyurethane can include a modified or unmodified polymeric core of either polyurethane or a copolymer that includes polyurethane. Suitable polyurethanes can include aliphatic as well as aromatic polyurethanes.

In another example, the polyurethane can include an aromatic polyether polyurethane, an aliphatic polyether polyurethane, an aromatic polyester polyurethane, an aliphatic polyester polyurethane, an aromatic polycaprolactam polyurethane, an aliphatic polycaprolactam polyurethane, or a combination thereof. In a more specific example, the polyurethane can include an aromatic polyether polyurethane, an aliphatic polyether polyurethane, an aromatic polyester polyurethane, an aliphatic polyester polyurethane, and a combination thereof.

In some examples, a polyurethane-based (PU) binder dispersion can comprise water and a polyurethane. The polyurethane can be dispersed in the water.

In some examples, the polyurethane in the polyurethane-based binder dispersion can comprise:

(A) a polyisocyanate;

(B) a first polyol having a chain with two hydroxyl functional groups at one end of the chain and no hydroxyl groups at an opposed end of the chain;

(C) a second polyol having a chain with two hydroxyl functional groups at both ends of the chain;

(D) a carboxylic acid functional group with two hydroxyl functional groups; and (E) a sulfonate or sulfonic acid functional group having two or more amino functional groups.

In some examples, the polyurethane in the polyurethane-based binder dispersion can further comprise: (F) a homopolymer or copolymer of poly(ethylene glycol) having one or two hydroxyl functional groups or one or two amino functional groups at one end of its chain.

(A) Polyisocyanate(s)

In some examples, any suitable polyisocyanate may be used. For example, a polyisocyanate having an average of two or more isocyanate groups may be used. In an example, the polyisocyanate may be an aliphatic, cycloaliphatic, araliphatic, or aromatic polyisocyanate, as well as products of their oligomers, used alone or in mixtures of two or more. In an example, the polyisocyanate is an aliphatic polyisocyanate or a cycloaliphtic polyisocyanate, either of which has a reduced tendency to yellow.

Some examples of polyisocyanates include hexamethylene-1,6-diisocyanate (HDI), 2,2,4-trimethyl-hexamethylene-diisocyanate (TMDI), 1,12-dodecane diisocyanate, 2,4, 4-trimethyl-hexamethylene diisocyanate, 2-methyl-1,5-pentamethylene diisocyanate, isophorone diisocyanate (IPDI), dicyclohexylmethane-4,4-diisocyanate (H12MDI), and combinations thereof.

The amount of the polyisocyanate in the polyurethane-based binder dispersion ranges from about 20 wt % to about 45 wt % of the total wt % of the polyurethane-based binder dispersion. In an example, polyisocyanate makes up from about 25 wt % to about 35 wt % of the polyurethane binder.

(B) First Polyol(s)

The amount of component (b) (i.e., the first polyol) in the polyurethane-based binder dispersion can range from about 10 wt % to about 70 wt % of the total wt % of the polyurethane-based binder dispersion. In an example, component (b) (i.e., the first polyol) can make up from about 30 wt % to about 60 wt % of the polyurethane binder.

The first polyol can include any product having a chain with two hydroxyl groups at one end of the chain and no hydroxyl groups at the opposed end of the chain. The first polyol has a number average molecular weight ($M_n$) ranging from about 500 g/mol to about 5000 g/mol. Additionally, the first polyol has a glass transition temperature ($T_g$) ranging from about −20° C. to about 100° C. In an example, the glass transition temperature can range from about 0° C. to about 80° C.

The first polyol may be formed from the free radical polymerization of a monomer in the presence of a mercaptan that includes two hydroxyl functional groups or two carboxylic functional groups.

Without wishing to be bound by theory, the first polyol may contribute to the improved decap of an inkjet ink because the hydroxyl groups at one end of the chain of the polyol can be incorporated into the polyurethane backbone chain, while the group at the other end of the polyol forms a pendant group or pendant chain depending on what specific polyol is used. The first polyol may segregate in the aqueous ink, which renders the polyurethane binder readily dispersible (i.e., more stable) in the ink vehicle. The first polyol may also help prevent the polyurethane from swelling.

Some examples of the monomer used to form component (b) include an alkylester of acrylic acid or an alkylester of methacrylic acid, such as methyl (meth)acrylate, ethyl (meth)acrylate, n-butyl (meth)acrylate, tetrahydrofuryl (meth)acrylate, t-butyl (meth)acrylate, 2-ethylhexyl (meth) acrylate, hexyl (meth)acrylate, cyclohexyl (meth)acrylate, phenyl (meth)acrylate, benzyl (meth)acrylate, 2-aziridinylethyl (meth)acrylate, aminomethyl acrylate, aminoethyl acrylate, aminopropyl (meth)acrylate, amino-n-butyl(meth) acrylate, N,N-dimethylaminoethyl(meth)acrylate, N,N-dimethylaminopropyl (meth)acrylate, N,N-diethylaminoethyl (meth)acrylate, and N,N-diethylaminopropyl (meth)acrylate.

Some other examples of the monomer used to form component (b) include an acid group containing monomer, such as acrylic acid, methacrylic acid, carboxyethyl (meth)acrylate, 2-(meth)acryloyl propionic acid, crotonic acid, and itaconic acid. In another example, the monomer used to form component (b) may be an acrylamide, an acrylamide derivative, methacrylamide, or a methacrylamide derivative. Some examples of acrylamide and methacrylamide derivatives include hydroxyethylacrylamide, N,N-methylol(meth)acrylamide, N-butoxymethyl (meth)acrylamide, and N-isobutoxymethyl (meth)acrylamide.

Some further examples of the monomer used to form component (b) may be styrene or a styrene derivative. Some examples of styrene derivatives include alpha-methyl styrene, p-aminostyrene, and 2-vinylpyridine. Additionally, the monomer used to form component (b) may be acrylonitrile, vinylidene chloride, a fluorine containing acrylate, a fluorine containing methacrylate, a siloxane containing acrylate, a siloxane containing methacrylate, vinyl acetate, or N-vinylpyrrolidone. Some specific examples include 2,2,2-trifluoroethyl acrylate, 1H,1H,3H-hexafluorobutyl acrylate, 1H,1H,3H-tetrafluoropropyl methacrylate, 1H,1H,5H-octafluoropentyl methacrylate, 1H,1H,5H-octafluoropentyl acrylate, poly(dimethylsiloxane), methacryloxypropyl terminated polydimethylsiloxane DMS-R11 (made by Gelest Chemicals), and (3-acryloxy-2-hydroxypropoxypropyl) terminated polydimethylsiloxane DMS-U21 (made by Gelest Chemicals). It is to be understood that any combination of monomers listed for component (b) may be used.

Some examples of the mercaptan used to form component (b) include 1,2-propanediol (thioglycerol), 1-mercapto-1,1-ethanediol, 2-mercapto-1,3-propanediol, 2-mercapto-2-methyl-1,3-propanediol, 2-mercapto-2-ethyl-1,3-propanediol, 1-mercapto-2,3-propanediol, 2-mercaptoethyl-2-methyl-1,3-propanediol, and thioglycolic acid.

In one example, component (b) may be formed by preparing a solution of the monomer and mercaptan in an organic solvent. When a combination of two monomers is used, the two monomers may be present in a ratio ranging from about 1:1 to about 9:1. In an example, methyl methacrylate and 2-ethylhexyl acrylate can be used in a combination of 9:1 respectively. When a combination of three monomers is used, the three monomers may be present in a ratio ranging from about 1:6.5:2.5 to about 7.5:2:0.5. In an example, methyl methacrylate, 2-ethylhexyl acrylate, and methacrylic acid ca be used in a combination of 7.5:2:0.5 respectively. Examples of other suitable monomer combinations used in forming component (b) may be found in Table 2 of the Examples section.

After the solution (including the monomer and the mercaptan) is prepared, the solution can be placed in an inert environment. For example, a flow of nitrogen gas may be introduced through the solution to create the inert environment. The solution may then be heated to a suitable temperature for polymerization, and the reaction may be allowed to occur for a suitable time. The time and temperature for polymerization can depend upon the monomer(s) and mercaptan(s) used. In an example, the polymerization temperature can be about 50° C. to about 90° C., and the reaction can be allowed to occur for from about 6 hours to about 12 hours. In another example, the polymerization temperature can be from about 65° C. to about 90° C.

The first polyol formed may include the mercaptan ranging from about 2 wt % to about 10 wt % based on the total weight of the first polyol. In an example, the mercaptan may make up about 5 wt % of the total weight of the first polyol.

(C) Second Polyol(s)

In some examples, the second polyol (i.e., component (c)) can be present in the polyurethane-based binder dispersion in an amount of from about 8 wt % to about 25 wt % based on the total weight of the polyurethane-based binder dispersion. In an example, component (b) (i.e., the first polyol) makes up from about 10 wt % to about 20 wt % of the polyurethane binder.

The second polyol(s) can have a number average molecular weight ($M_n$) of about 500 g/mol to about 3000 g/mol and have one hydroxyl group attached at each end of the polyol. Examples of second polyols include polyester polyols, polyether polyols, polycarbonate polyol, polyester-polycarbonate polyol, or mixtures thereof.

In some examples, the second polyol can be poly(propyleneglycol), poly(tetrahydrofuran), poly(carbonate) polyol, or mixtures thereof. Examples of polycarbonate polyol include polycarbonate polyols from Kuraray Co. Ltd. (e.g., C-590, C-1050, C-1090, C-2050, C-2090, and C-3090) and polycarbonate diols from UBE Industries, Ltd. (e.g., ETERNACOLL® UH-50, ETERNACOLL® UH-100, ETERNACOLL® UH-200, ETERNACOLL® PH-5-, ETERNACOLL® PH-100, ETERNACOLL® PH-200 and ETERNACOLL® UM90(1/3)).

(D) Carboxylic Acid Functional Group(s)

Component (d) can be a carboxylic acid functional group with two hydroxyl functional groups. The amount of component (d) in the polyurethane-based binder dispersion ranges from 1 wt % to about 10 wt % based upon the total wt % of the polyurethane. In an example, component (d) makes up from about 2 wt % to about 6 wt % of the polyurethane binder.

The presence of component (d) assists in the ability of the polyurethane to be dissolved or dispersed in water after ionization with a base. As previously stated, component (d) can be a carboxylic acid. In some instances, component (d) includes two or more hydroxyl groups. Component (d) may have a number average molecular weight ($M_n$) of about 500 g/mol. Examples of component (d) may be derived from hydroxy-carboxylic acids having the general formula $(HO)_x Q(COOH)_y$, where Q is a straight or branched hydrocarbon radical containing 1 to 12 carbon atoms, and x is 2 or 3 and y ranges from 1 to 3.

Examples of component (d) can include dimethylol propionic acid (DMPA), dimethylol butanoic acid (DMBA), alanine, citric acid, tartaric acid, glycolic acid, lactic acid, malic acid, dihydroxymaleic acid, dihydroxytartaric acid, or mixtures thereof.

(E) Sulfonic/Sulfonate Amine Compound(s)

In some examples, the sulfonate or sulfonic acid amine compound (i.e., component (e)) can have two or more amino functional groups. In some examples, sulfonate or sulfonic acid amine compound (i.e., component (e)) can have two to ten amino functional groups. In some examples, sulfonate or sulfonic acid amine compound (i.e., component (e)) can have two to four amino functional groups. In some examples, sulfonate or sulfonic acid amine compound (i.e., component (e)) can have two amino functional groups.

The polyurethane-based binder dispersion disclosed herein, which may include component (e), improves the decap performance and print reliability of the inkjet ink including the dispersion while improving image quality. Component (e) may be present in the polyurethane-based binder dispersion an amount ranging from about 1 wt % to about 20 wt % based upon the total wt % of the polyurethane-based binder dispersion. In an example, component (e) can be present in an amount ranging from about 2 wt % to about 20 wt % of the polyurethane-based binder dispersion. In another example, component (e) may be present in an amount of about 5 wt % to about 15 wt % of the polyurethane-based binder dispersion.

Some examples of component (e) include ethyldiamineethylsulfonic acid or a salt thereof, ethyldiaminepropylsulfonic acid or a salt thereof, 5-amino-2-(aminomethyl)-1-pentanesulfonic acid or a salt thereof, 2,3-diamino-1-propanesulfonic acid or a salt thereof, 3-[bis(2-aminoethyl) amino]-1-propanesulfonic acid or a salt thereof, 2-[bis(2-aminoethyl)amino]-ethanesulfonic acid or a salt thereof, 2-[(2-aminoethyl)amino]-1-propanesulfonic acid or a salt thereof, 2-[[2-[(1-methylethyl)amino]ethyl]amino]-ethanesulfonic acid or a salt thereof, 2-[(2-aminoethyl)amino]-1-pentanesulfonic acid or a salt thereof, or mixtures thereof.

In some examples, component (e) is a compound shown in Table A below.

TABLE A

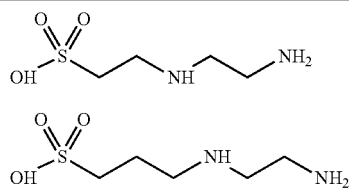

TABLE A-continued

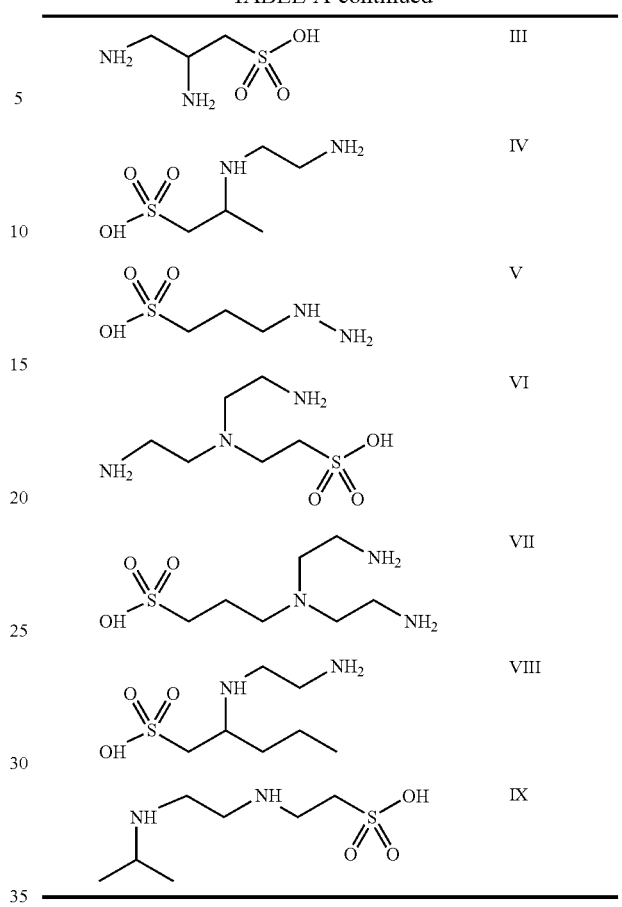

In some examples, component (e) can be sodium 2-[(2-aminoethyl)amino]ethanesulphonate or sodium diaminoethylpropylsulfonate.

(F) Homopolymer(s) or Copolymer(s) of Poly(Ethylene Glycol)

In some examples, component (f) can be a homopolymer or copolymer of poly(ethylene glycol) having one hydroxyl functional group or one amino functional group. In other examples, component (d) may be a homopolymer or copolymer of poly(ethylene glycol) having two hydroxyl functional groups or two amino functional groups at one end of its chain.

The homopolymer or copolymer of poly(ethylene glycol) has a number average molecular weight ($M_n$) ranging from about 500 g/mol to about 5,000 g/mol. In another example, the homopolymer or copolymer of poly(ethylene glycol) has a number average molecular weight ($M_n$) ranging from about 500 g/mol to about 3,000 g/mol. Component (f) also has a water solubility of greater than 30% v/v (volume of poly(ethylene glycol) to volume of water).

Examples of the polyurethane-based binder dispersion disclosed herein including component (f) can increase the gloss and optical density of a printed image on media when compared to the gloss and optical density of a printed image on the same media formed with an ink that includes other types of polyurethane dispersions that do not include component (f). Without wishing to be bound by theory, this may be due, in part, because, when included, component (f) prevents the polyurethane-based binder dispersion from reacting with an underlying pre-treatment fixing fluid, which would otherwise cause the polyurethane binder to coagulate when the ink composition is applied to the medium. As such, component (f) renders the polyurethane-based binder dispersion insensitive to the pre-treatment fixing fluid, and thus prevents polyurethane coagulation. As the polyurethane-based binder does not strongly interact with the pre-treatment fixing fluid to cause coagulation, the polyurethane can form a film when printed, which can affect the gloss and optical density of the printed image.

The amount of component (f) in the polyurethane-based binder dispersion ranges from 0 wt % to about 20 wt % based upon the total wt % of the polyurethane-based binder dispersion. In an example, component (f) can be present in the polyurethane-based binder dispersion in an amount of from about 5 wt % to about 15 wt % of the polyurethane-based binder dispersion.

Any copolymer of poly(ethylene glycol) with one or two hydroxyl and/or amino group(s) may be used as component (f), as long as the copolymer has water solubility of >about 30% v/v and a suitable number average molecular weight. Some examples of suitable copolymers for component (f) include a copolymer of poly(ethylene) and poly(ethylene glycol) with one hydroxyl functional group (e.g.,

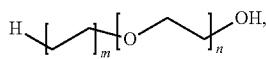

where m=1-10 and n=5-50, a copolymer of poly(propylene glycol) and poly(ethylene glycol) with one hydroxyl functional group, and a copolymer of poly(ethylene glycol) and poly(propylene glycol) with one amino functional group. Some commercially available examples of the copolymer of poly(ethylene glycol) and poly(propylene glycol) with one amino functional group include JEFFAMINE® M-1000 (i.e.,

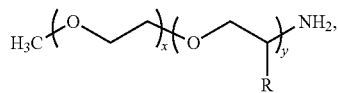

where x=19 and y=3) and JEFFAMINE® M-2070 (i.e.,

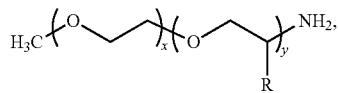

where x=31 and y=10) (both produced by Huntsman Chemicals).

Some additional examples of component (f) include a poly(ethylene glycol) homopolymer, such as monoamine terminated poly(ethylene glycol) (i.e.,

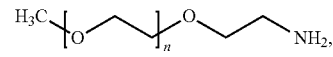

where n=5-100, and a poly(ethylene glycol) mono alkyl ether. Examples of the poly(ethylene glycol) mono alkyl ether include an alkyl group with C1 to C8 straight or branched hydrocarbons, such as methyl, ethyl, and butyl groups. Examples of the poly(ethylene glycol) mono alkyl ether include poly(ethylene glycol) monomethyl ether (i.e.,

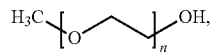

where n=5-100, poly(ethylene glycol) monoethyl ether, poly(ethylene glycol) monopropyl ether, and poly(ethylene glycol) monobutyl ether.

Furthermore, any homopolymer of poly(ethylene glycol) with two hydroxyl or amino groups at one end of the polymer chain may alternatively be used as component (f), as long as the homopolymer has water solubility of >about 30% v/v and a suitable number average molecular weight. As an example, the homopolymer may be two hydroxyl terminated poly(ethylene glycol), where both hydroxyls can be located at one end of the chain. One commercially available example is YMER™ N120 (a linear difunctional polyethylene glycol monomethyl ether from Perstorp).

In some examples, the polyurethane can be defined as the following:

(A) is isophorone diisocyanate, which is present in the polyurethane in an amount of from about 24 wt % to about 30 wt % based on the total weight of the polyurethane, (B) is a copolymer of methyl methacrylate-co-ethylhexylacrylate-co-ethoxyethoxyethylacrylate with two hydroxy groups at one end, which is present in the polyurethane in an amount of from about 40 wt % to about 50 wt % based on the total weight of the polyurethane, wherein (B) the copolymer comprises about 75 wt % of methyl methacrylate, about 15 wt % of ethylhexylacrylate, and about 10 wt % of ethoxyethoxyethylacrylate, each based on the total weight of (B), (C) is polypropylene glycol with a $M_n$ of 1000 g/mol, which is present in the polyurethane in an amount of from about 12 wt % to about 18 wt % based on the total weight of the polyurethane, (D) is dimethylolpropionic acid, which is present in the polyurethane in an amount of from about 2 wt % to about 6 wt % based on the total weight of the polyurethane, and (E) is sodium 2-[(2-aminoethyl)amino]ethanesulphonate, which is present in the polyurethane in an amount of from about 8 wt % to about 12 wt % based on the total weight of the polyurethane.

Method(s) of Making the Polyurethane-Based Binder Dispersion(s)

In an example, the method for making the polyurethane binder dispersion can include mixing components (A), (B), (C), and (D) in a reactor with an organic solvent (e.g., methyl ethyl ketone (MEK), tetrahydrofuran (THF), ethyl acetate, acetone, or combinations thereof) and a catalyst (e.g., dibutyl tin dilaurate, bismuth octanoate, and 1,4-diazabicyclo[2.2.2]octane). The reactor may be maintained at a constant temperature and under a dry air mixture. The components may be mixed and the polymerization reaction may be allowed to occur until the % NCO reaches the theoretical value. In an example, the reaction time ranges from about 4 hours to about 14 hours. In another example, the polymerization reaction can occur for about 10 hours at about 60° C. to achieve the theoretical value of the % NCO.

After mixing components (A), (B), (C), and (D) as described above, component (F) can then be added to the polymerization reaction of components (A), (B), (C), and (D). Polymerization can be continued until the % NCO reaches the theoretical value. The polymerization reaction may be allowed to occur for a time ranging from about 20 to 40 minutes. In an example, the polymerization reaction occurs for about 30 minutes at about 60° C. to achieve the theoretical value of the % NCO.

Next, component (E) can be dissolved in one equivalent of a base and a sufficient amount of deionized water to fully dissolve component (E). Some examples of the base include ammonia, trimethylamine, triethylamine, sodium hydroxide, potassium hydroxide, and lithium hydroxide. The polymer solution made from components (A), (B), (C), and (D) and in some instances (F) can be cooled to a temperature ranging from about 30° C. to about 50° C. The aqueous solution of component (E) can be added to the polymer solution of (A), (B), (C), and (D) (if component (F) is not included) or after adding component (F) (if component (F) is included) with vigorous mixing at a temperature ranging from about 30° C. to about 50° C. for at least about 30 minutes.

In an example, the polyurethane solution comprising components (A)-(E) or components (A)-(F) may be added to water including a base slowly (e.g., over a 30 minute period) with vigorous agitation or vice versa. The mixture may be stirred and organic solvent may be removed by distillation to form the polyurethane binder dispersion. In an example, the acid number of the polyurethane-based binder dispersion ranges from about 10 mg KOH/g solid resin to about 70 mg KOH/g solid resin or from about 30 mg KOH/g solid resin to less than 60 mg KOH/g solid resin.

Once the polyurethane-based binder dispersion is prepared, the particle size of the polyurethane-based binder in the dispersion ranges from about 10 nm to about 200 nm. In an example, the particle size of the polyurethane binder ranges from about 10 nm to about 100 nm. In an example, the particle size of the polyurethane binder ranges from about 15 nm to about 30 nm.

Without wishing to be bound by theory, it is believed that the obtained polyurethane binder particle sizes (i.e., in some examples between about 10 nm and about 100 nm and in some examples between about 15 nm and about 30 nm) can improve pen life and ink stability because the polyurethane binder described herein can form "softer" films compared with other known binders that form films that can be too "hard" to re-dissolve or blast away during sustained printing.

In some examples, the polyurethane-based binder dispersion can include from about 10 wt % to about 95 wt % water based on the total weight of the polyurethane-based binder dispersion.

The polyurethane polymer can have a weight average molecular weight (Mw) from about 15,000 g/mol to about 120,000 g/mol. In some examples, the polyurethane polymer can have an Mw of about 18,000 g/mol to about 60,000 g/mol or from about 22,000 g/mol to about 40,000 g/mol.

Further, the polyurethane polymer can be present in the ink composition in an amount from about 0.5 wt % to about 20 wt % based on the total weight of the inkjet ink composition. In some examples, the polyurethane polymer can be present in the ink composition in an amount from about 1 wt % to about 10 wt % based on the total weight of the inkjet ink composition. In yet other examples, the polyurethane can be present in an amount from about 2 wt % to about 8 wt %, or from about 3 wt % to about 7 wt %.

Solvent(s)

In some examples, the inkjet ink compositions can include glycerol as the main non-aqueous solvent.

In some examples, glycerol can be present in the inkjet ink composition in an amount of from about 1 wt % to about 20 wt % based on the total weight of the inkjet ink composition. In some examples, the glycerol can be present in the inkjet ink composition in an amount of from about 3 wt % to about 12 wt % based on the total weight of the inkjet ink composition. In some examples, the glycerol can be present in the inkjet ink composition in an amount of from about 5 wt % to about 10 wt % based on the total weight of the inkjet ink composition. In some examples, the glycerol can be present in the inkjet ink composition in an amount of from about 5 wt % to about 7 wt % based on the total weight of the inkjet ink composition.

In some examples, the solvents in the inkjet ink compositions can further include aliphatic alcohols, aromatic alcohols, diols, triols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, co-solvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides.

Specific examples of certain co-solvents that may likewise be used include, but are not limited to, hydantoin glycol (such as, e.g., 1,3-bis-(2-hydroxyethyl)-5,5-dimethylhydantoin), 1-(2-hydroxyethyl)-2-pyrrolidinone, 1-(2-hydroxyethyl)-2-imidazolidinone, tetratethylene glycol, 1,2,6-hexanetriol, glycerol, glycerol propoxylate, 1,5-pentanediol, LIPONIC® ethoxylated glycerol 1 (LEG-1), LIPONIC® ethoxylated glycerol 7 (LEG-7), 2-methyl-2,4-pentanediol, 2-methyl-1,3-propanediol, 2-ethyl-2-hydroxymethyl-1,3-propanediol, diethylene glycol, 3-methoxybutanol, propylene glycol monobutyl ether, 1,3-dimethyl-2-imidazolidinone, the like, or combinations thereof.

Co-solvents can be added to reduce the rate of evaporation of water in the inkjet ink, to minimize clogging, or contribute to other improved properties related to viscosity, pH, surface tension, optical density, gamut, durability, decap, and print quality, for example.

The solvents other than glycerol can be present in the inkjet ink compositions in amounts ranging from about 1 wt % to about 10 wt % (based on the total weight of the inkjet ink composition), depending, at least in part, on the jetting architecture.

Surfactant(s)

Surfactant(s) can be added to inkjet ink composition(s) in some examples. The surfactants in the inkjet ink compositions may include non-ionic, cationic, and/or anionic surfactants, which may be present in amounts ranging from about 0.1 wt % to about 10 wt % based on the total weight of the inkjet ink composition. In some examples, the inkjet ink composition can include surfactants in amounts ranging from about 0.1 wt % to about 5 wt % based on the total weight of the inkjet ink composition.

In some examples, the inkjet ink compositions can include ethoxylated alcohols such as those from the Tergitol® series (e.g., Tergitol® 15S30, or Tergitol® 15S9), manufactured by Dow Chemical; surfactants from the Surfynol® series (e.g., Surfynol® 104, Surfynol® 440 and Surfynol® 465), and Dynol™ series (e.g., Dynol™ 360, Dynol™ 604, and Dynol™ 607) manufactured by Air Products and Chemicals, Inc.; fluorinated surfactants, such as those from the Zonyl® family (e.g., Zonyl® FSO and Zonyl® FSN surfactants), manufactured by E.I. DuPont de Nemours and Company; alkoxylated surfactant such as Tego® Wet 510 manufactured from Evonik; fluorinated PolyFox® nonionic surfactants (e.g., PF159 nonionic surfactants), manufactured by Omnova; or combinations thereof.

Polysorbate surfactants can include Polysorbate 20 (or polyoxyethylene 20 sorbitan monolaurate), Polysorbate 40 (or polyoxyethylene 20 sorbitan monopalmitate), Polysorbate 60 (or polyoxyethylene 20 sorbitan monostearate), Polysorbate 80 (or polyoxyethylene 20 sorbitan monooleate), or the like. However, not all of these polysorbates have at least 50 wt % lipophilic oleic acid groups and having an HLB value of less than 15. Brand names for these polysorbate surfactants include those sold under the tradename Tween® or Alkest®. Regarding the nomenclature of these polysorbates, the number "20" following "polyoxyethylene" refers to the total number of oxyethylene —(CH2CH2O)— groups found in the molecule. The number 20, 40, 60, or 80 following "polysorbate" is related to the type of fatty acid associated with the polyoxyethylene sorbitan portion. Monolaurate is indicated by 20, monopalmitate is indicated by 40, monostearate by 60 and monooleate by 80.

Other polysorbates can likewise be used, including Polysorbate 85, or Tween® 85, which is polyethylene glycol sorbitan trioleate; or Polysorbate 81, or Tween® 81, which is a polyoxyethylene (5) sorbitan monooleate. Tween® 85 and Tween® 81 are oleyl type compounds and include 70 wt % oleic acid. Polyoxyethylene sorbitan dioleate can also be used.

Another surfactant that can be used includes polyoxyethylene glycol ethers. Examples surfactants that can be used include Brij® S, Brij® O, Brij® C, and Brij® L type surfactants Synperonic surfactants can also be used. Specific examples include Brij® S10, Brij® S5, Brij®, S15, Brij® S20, Brij® S2/93, Brij® S7, Brij® 98/020, Brij® 010, Brij® 02, Brij®, 03, Brij® 05, Brij® C2, Brij® C7, Brij® 010, Brij®, C20, Brij® L4/30, Brij® L9, Brij® L15, Synperonic® 91-2.5, Synperonic® 91-2.5, Synperonic® 91-10, or mixtures thereof.

Additive(s)

The additives in the inkjet ink compositions can be selected from the group consisting of anti-kogation agents, pH adjusters, antimicrobial agents, sequestering agents, viscosity modifiers, humectants, penetrants, wetting agents, preservatives, jettability additives, waxes, and mixtures thereof.

Kogation refers to the deposit of dried ink on a heating element of a thermal inkjet printhead. Anti-kogation agent(s) is/are included to assist in preventing the buildup of kogation. Anti-kogation agents can include an anionic surfactant, a nonionic surfactant, a zwitterionic surfactant, an amphoteric surfactant, or mixtures thereof. A list of surfactants is given above. In some examples, the anti-kogation agents can include oleth-3-phosphate (commercially available as CRODAFOS® O3A or CRODAFOS® N-3 acid) or dextran 500 k. The anti-kogation agent may be present in the inkjet ink composition in an amount ranging from about 0.1 wt % to about 3 wt % of the total weight of the inkjet ink composition.

pH adjuster(s) can be added to the inkjet ink compositions in some examples. pH adjuster(s) can include sodium hydroxide, potassium hydroxide, ammonia, hydrochloric acid, nitric acid, sulfuric acid, and (poly)alkanolamines such as triethanolamine and 2-amino-2-methyl-1-propaniol, or mixtures thereof.

In some examples, the inkjet ink composition may also include antimicrobial agent(s). Suitable antimicrobial agents include biocides and fungicides. Examples of antimicrobial agents include ACTICIDE® M20 (i.e., active ingredient is 2-methyl-4-isothiazolin-3-one), ACTICIDE® B20 (i.e., active ingredient is 1,2-benzisothiazolin-3-one), AMP (i.e., amino-tris-(methylene phosphonate), TRIS (i.e., tris(hydroxymethyl)nitromethane), and mixtures thereof. Other examples of antimicrobial agent(s) include NUOSEPT® (Ashland Inc.), UCARCIDE™ or KORDEK™ (Dow Chemical Co.), and PROXEL® (Arch Chemicals) series, and combinations thereof.

In some examples, sequestering agents can be added to the inkjet ink compositions. These sequestering agents may be useful to impart improved stability characteristics to the inkjet ink composition and can include an alkali metal, an alkaline earth metal, and an ammonium salt of a linear aliphatic substituted glycine compound. The term "linear aliphatic substituted glycine" designates glycine compounds in which the amino group of glycine has been substituted with linear aliphatic groups. In some examples, the sequestering agents may include the alkali metal (e.g., sodium), alkaline earth metal (e.g., calcium) and ammonium salts of ethylene diamine tetraacetic acid, nitrilo triacetic acid, diethylene triamine pentaacetic acid, hydroxyethylene diamine triacetic acid, dihydroxyethyl glycine, iminodiacetic acid and ethanol diglycine. Similar salts of other linear aliphatic substituted glycine compounds may also be used.

In some examples, viscosity modifiers can be added to the inkjet ink compositions. Examples of viscosity modifiers include aliphatic ketones, stearone, 2-hydroxybenzyl alcohol, 4-hydroxybenzyl alcohol, 4-nitrobenzyl alcohol, 4-hydroxy-3-methoxy benzyl alcohol, 3-methoxy-4-nitrobenzyl alcohol, 2-amino-5-chlorobenzyl alcohol, 2-amino-5-methylbenzyl alcohol, 3-amino-2-methylbenzyl alcohol, 3-amino-4-methyl benzyl alcohol, 2(2-(aminomethyl)phenylthio)benzyl alcohol, 2,4,6-trimethylbenzyl alcohol, 2-amino-2-methyl-1,3-propanediol, 2-amino-1-phenyl-1,3-propanediol, 2,2-dimethyl-1-phenyl-1,3-propanediol, 2-bromo-2-nitro-1,3-propanediol, 3-tert-butylamino-1,2-propanediol, 1,1-diphenyl-1,2-propanediol, 1,4-dibromo-2,3-butanediol, 2,3-dibromo-1,4-butanediol, 2,3-dibromo-2-butene-1,4-diol, 1,1,2-triphenyl-1,2-ethanediol, 2-naphthalenemethanol, 2-methoxy-1-naphthalenemethanol, decafluoro benzhydrol, 2-methylbenzhydrol, 1-benzeneethanol, 4,4'-isopropylidene bis(2-(2,6-dibromo phenoxy)ethanol), 2,2'-(1,4-phenylenedioxy)diethanol, 2,2-bis(hydroxymethyl)-2,2',2''-nitrilotriethanol, di(trimethylolpropane), 2-amino-3-phenyl-1-propanol, tricyclohexylmethanol, tris(hydroxymethyl)aminomethane succinate, 4,4'-trimethylene bis(1-piperidine ethanol), N-methyl glucamine, or mixtures thereof.

In some examples, the inkjet ink compositions described herein may contain a high-boiling water-soluble organic solvent, which can serve as a wetting agent or humectant for imparting water retentivity and wetting properties to the inkjet ink composition. Such a high-boiling water-soluble organic solvent includes one having a boiling point of 180° C. or higher. Examples of the water-soluble organic solvent having a boiling point of 180° C. or higher are ethylene glycol, propylene glycol, diethylene glycol, pentamethylene glycol, trimethylene glycol, 2-butene-1,4-diol, 2-ethyl-1,3-hexanediol, 2-methyl-2,4-pentanediol, tripropylene glycol monomethyl ether, dipropylene glycol monoethyl glycol, dipropylene glycol monoethyl ether, dipropylene glycol monomethyl ether, dipropylene glycol, triethylene glycol monomethyl ether, tetraethylene glycol, triethylene glycol, diethylene glycol monobutyl ether, diethylene glycol monoethyl ether, diethylene glycol monomethyl ether, tripropylene glycol, polyethylene glycols having molecular weights of 2000 g/mol or lower, 1,3-propylene glycol, isopropylene glycol, isobutylene glycol, 1,4-butanediol, 1,3-butanediol, 1,5-pentanediol, 1,6-hexanediol, glycerol, erythritol, pentaerythritol, or combinations thereof.

In some examples, the inkjet ink compositions may also contain penetrants for accelerating penetration of the inkjet ink composition into the recording medium. Suitable penetrants include polyhydric alcohol alkyl ethers (glycol ethers) and/or 1,2-alkyldiols. Examples of suitable polyhydric alcohol alkyl ethers are ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, ethylene glycol mono-n-propyl ether, ethylene glycol mono-isopropyl ether, diethylene glycol mono-isopropyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, dipropylene glycol mono-isopropyl ether, propylene glycol mono-n-butyl ether, dipropylene glycol mono-n-butyl ether, or combinations thereof. Examples of 1,2-alkyldiols can include 1,2-pentanediol, 1,2-hexanediol, or combinations thereof. The penetrant may also be selected from straight-chain hydrocarbon diols, such as 1,3-propanediol, 1,4-butanediol, 1,5-pentanediol, 1,6-hexanediol, 1,7-heptanediol, 1,8-octanediol, and combinations thereof. Glycerol may also be used as a penetrant.

In some examples, the inkjet ink compositions can contain preservatives. Specific examples of preservatives can include dichlorophene, hexachlorophene, 1, 2-benzothiazolin-3-one, 3,4-isothiazolin-3-one, or 4,4-dimethyl oxazolidine, alkyl isothiazolone, chloroalkyl isothiazolone, benzoisothiazolone, bromonitroalcohol, chloroxylenol, or mixtures thereof.

In some examples, the inkjet ink compositions can include jettability additives. Jettability additives can include LIPONIC® EG-1 (ethoxylated glycerol; available from Vantage Specialty Ingredients, Inc.).

In some examples, the inkjet ink compositions can include a wax. Wax emulsions are commercially available from a number of vendors, for example Keim-Additec, Lubrizol, Michelman, and BYK Chemie. Wax emulsions that can be added to the inkjet ink compositions described herein and can include but are not limited to: Lubrizol: LIQUILUBE™ 411, LIQUILUBE™ 405, LIQUILUBE™ 488, LIQUILUBE™ 443, LIQUILUBE™ 454; Michelman: ME80825, ME48040, ME98040M1, ME61335, ME90842, ME91240, ML160, Keim-Additec: ULTRALUBE® E-521/20, ULTRALUBE® E-7093, ULTRALUBE® 7095/1, ULTRALUBE® E-8046, ULTRALUBE® E-502V, ULTRALUBE® E-842N: Byk: AQUACER® 2650, AQUACER® 507, AQUACER® 533, AQUACER® 515, AQUACER® 537, AQUASLIP™ 671, AQUASLIP™ 942. Wax can be added to the inkjet in k compositions in amounts of from about 0.1 wt % to about 5 wt % based on the total weight of the inkjet ink composition.

The additive(s) can be added singularly or in various combinations to the inkjet ink compositions described herein in total amounts of from about 0.1 wt % to about 10 wt % based on the total weight of the inkjet ink composition.

Water

The inkjet ink compositions described herein also include water (e.g., deionized water) in amounts to make up the balance of the inkjet ink compositions. In some examples, water can be present in the inkjet compositions in amounts greater than about 50 wt % based on the total weight of the inkjet ink composition. In some examples, the water can be present in the inkjet ink compositions in amounts from about 50 wt % to about 90 wt % based on the total weight of the inkjet ink composition. In other examples, the inkjet ink composition can include from about 60 wt % to about 88 wt % water. In further examples, the inkjet ink composition can include from about 70 wt % to about 85 wt % water.

Solvent System

As used herein, the "solvent system" includes the solvent(s) described above and water.

Method(s) of Making Inkjet Ink Composition(s)

In some examples, a method of making an inkjet ink composition is described. The method(s) can comprise mixing at least one colorant, at least one solvent comprising glycerol in an amount of from about 1 wt % to about 20 wt % based on the total weight of the inkjet ink composition, water, and at least one binder to form the inkjet ink composition. In some examples, the binder can comprise a polyurethane-based binder dispersion, which can comprise water and a polyurethane.

In some examples, the polyurethane in the polyurethane-based binder dispersion can comprise: (A) a polyisocyanate, (B) a first polyol having a chain with two hydroxyl functional groups at one end of the chain and no hydroxyl groups at an opposed end of the chain, (C) a second polyol having a chain with two hydroxyl functional groups at both ends of the chain, (D) a carboxylic acid functional group with two hydroxyl functional groups, and (E) a sulfonate or sulfonic acid functional group having two amino functional groups. In some examples, the polyurethane in the polyurethane-based binder dispersion can further comprise: (F) a homopolymer or copolymer of poly(ethylene glycol) having one or two hydroxyl functional groups or one or two amino functional groups at one end of its chain.

Ink Sets

In some examples, ink sets are described. The ink sets can comprise: (i) a black ink comprising: water, at least one solvent comprising glycerol in an amount of from about 3 wt % to about 12 wt % based on the total weight of the inkjet ink composition; at least one black pigment in a polymeric dispersion, wherein the polymeric dispersion comprises a styrene acrylic polymer, and at least one binder, wherein the binder comprises a polyurethane-based binder dispersion, which comprises water and a polyurethane, wherein the polyurethane comprises: (A) a polyisocyanate, (B) a first polyol having a chain with two hydroxyl functional groups at one end of the chain and no hydroxyl groups at an opposed end of the chain, (C) a second polyol having a chain with two hydroxyl functional groups at both ends of the chain, and (D) a carboxylic acid functional group with two hydroxyl functional groups, (E) a sulfonate or sulfonic acid functional group having two amino functional groups; and (ii) a cyan ink comprising: water, at least one solvent comprising glycerol in an amount of from about 3 wt % to about 12 wt % based on the total weight of the inkjet ink composition; at least one cyan pigment in a polymeric dispersion, wherein the polymeric dispersion comprises a styrene acrylic polymer, and at least one binder, wherein the binder comprises a polyurethane-based binder dispersion, which comprises water and a polyurethane, wherein the polyurethane comprises: (A) a polyisocyanate, (B) a first polyol having a chain with two hydroxyl functional groups at one end of the chain and no hydroxyl groups at an opposed end of the chain, (C) a second polyol having a chain with two hydroxyl functional groups at both ends of the chain, (D) a carboxylic acid functional group with two hydroxyl functional groups, and (E) a sulfonate or sulfonic acid functional group having two amino functional groups.

In some examples, the polyurethane in the polyurethane-based binder dispersion in the black ink and/or the cyan ink can further comprise: (F) a homopolymer or copolymer of poly(ethylene glycol) having one or two hydroxyl functional groups or one or two amino functional groups at one end of its chain.

The ink sets can further comprise a magenta ink including at least one magenta pigment. The magenta ink can comprise water, at least one solvent comprising glycerol in an amount of from about 3 wt % to about 12 wt % based on the total weight of the inkjet ink composition; at least one magenta pigment in a polymeric dispersion, wherein the polymeric dispersion comprises a styrene acrylic polymer, and at least one binder, wherein the binder comprises a polyurethane-based binder dispersion, which comprises water and a polyurethane, wherein the polyurethane comprises: (A) a polyisocyanate, (B) a first polyol having a chain with two hydroxyl functional groups at one end of the chain and no hydroxyl groups at an opposed end of the chain, (C) a second polyol having a chain with two hydroxyl functional groups at both ends of the chain, (D) a carboxylic acid functional group with two hydroxyl functional groups, and (E) a sulfonate or sulfonic acid functional group having two amino functional groups. In some examples, the polyurethane in the polyurethane-based binder dispersion can further comprise: (F) a homopolymer or copolymer of poly(ethylene glycol) having one or two hydroxyl functional groups or one or two amino functional groups at one end of its chain.

The ink sets can further comprise a yellow ink. In some examples, the ink sets can comprise other inks comprising the colorant(s) described above.

In some examples, the ink sets can be used for printing, which can be accomplished via an inkjet printer, such as a thermal inkjet printer. Other inkjet printers can also be used (e.g., piezoelectric inkjet printers, other drop on demand inkjet printers, and/or continuous inkjet printers). The ink(s) from the ink set(s) may be printed onto any suitable substrate including coated media (e.g., photo paper and brochure paper) and plain paper (e.g., colorlok and non-colorlok).

Using Inkjet Ink(s)

In some examples, the inkjet ink(s) described may be used by applying the inkjet ink(s) to a media substrate.

In some examples, the inkjet inks can be applied to the substrate using any inkjet printer (e.g., thermal or piezoelectric). In some examples, in order to initiate the printing process, a printhead device in an inkjet printer can be activated to deliver the inkjet ink(s) from a cartridge onto a substrate. Activation of the printhead in an inkjet system can involve selective energization of resistors in order to heat the inkjet ink composition and thereby expel it from the cartridge containing the inkjet ink composition. If non-thermal-inkjet systems are used to deliver the composition, printhead activation can be accomplished using composition ejectors under consideration, with the procedures associated therewith varying from system to system.

The printing process discussed above is equally applicable to (A) systems in which an inkjet printhead device can be directly attached to a housing in order to form an integral, self-contained cartridge unit having a supply of ink composition within the housing; and (B) systems in which the housing and ink composition therein are remotely positioned from the printhead and in fluid communication therewith using tubular conduit(s).

In an example, the ink(s) may be applied to a coated offset medium. A coated offset medium can be any paper coated to impart better image quality by having some degree of surface gloss, smoothness, and reduced ink absorbency. Examples of commercially available coated offset media include STERLING® Ultra Gloss (NewPage Corp.) and UTOPIA® (Appleton Coated LLC). In other examples, the medium may be coated or uncoated paper. The medium may also be a vinyl or plastic material.

In some examples, the media or printing surface can include substrates made from paper, metal, plastic, fabric, or combinations thereof. In some examples, the media or printing surface can include plain papers, microporous photopapers, coated papers, glossy photopapers, semi-gloss photopapers, heavy weight matte papers, billboard papers, digital fine art papers, calendared papers, vinyl papers, or combinations thereof.

Unless otherwise stated, any feature described hereinabove can be combined with any example or any other feature described herein.

In describing and claiming the examples disclosed herein, the singular forms "a," "an," and "the" include plural referents unless the context clearly dictates otherwise.

It is to be understood that concentrations, amounts, and other numerical data may be expressed or presented herein in range formats. It is to be understood that such range formats are used merely for convenience and brevity and thus should be interpreted flexibly to include not just the numerical values explicitly recited as the end points of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same applies to ranges reciting a single numerical value.

Reference throughout the specification to "one example," "some examples," "another example," "an example," and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

Unless otherwise stated, references herein to "wt %" of a component are to the weight of that component as a percentage of the whole composition comprising that component. For example, references herein to "wt %" of, for example, a solid material such as pigment or latex polymer dispersed in a liquid composition are to the weight percentage of those solids in the composition, and not to the amount of that solid as a percentage of the total non-volatile solids of the composition.

To further illustrate the present disclosure, examples are given herein. It is to be understood that these examples are described for illustrative reasons and are not to be construed as limiting the scope of the present disclosure.

If a standard test is mentioned herein, unless otherwise stated, the version of the test to be referred to is the most recent at the time of filing this patent application.

All amounts in the examples below are in wt % unless indicated otherwise.

EXAMPLES

Ingredients and Abbreviations

Polyurethane (PU):
  Isophorone Diisocyanate—about 25.3 wt %
  Copolymer of methyl methacrylate-co-ethylhexylacrylate-co-ethoxyethoxyethylacrylate with two OH functional group at one end (75 wt %/15 wt %/10 wt %)—about 45.1 wt %
  Polypropylene Glycol (Mn 1000)—about 14.5 wt %
  dimethylolpropionic acid (DMPA)—about 4.0 wt %
  sodium 2-[(2-aminoethyl)amino]ethanesulphonate (VESTAMIN® A 95 by Evonik®)—about 11.1 wt %
  (PU Particle Size: about 20-25 nm diameter)
CRODAFOS™ N3—oleth-3 phosphate (sold by Croda International Plc).
DYNOL™ 360—surfactant manufactured by Air Products and Chemicals, Inc.
SURFYNOL® 440—surfactant manufactured by Air Products and Chemicals, Inc.
LIPONIC® EG-1—ethoxylated glycerol.
LIQUILUBE™ 405 Wax (polyethylene wax; sold by Lubrizol Deutschland GmbH).

Example 1

Inkjet ink compositions were prepared in accordance with Table 1 below.

TABLE 1

| Ink* Components | Glycerol K (black pigment containing formulation) | Tetraethylene glycol K (black pigment containing formulation) | Glycerol C (cyan pigment containing formulation) | Tetraethylene glycol C (cyan pigment containing formulation) |
|---|---|---|---|---|
| Glycerol | 6.00 | — | 6.00 | — |
| Tetraethylene glycol | — | 5.00 | — | 5.00 |
| Tripropyleneglycol methyl ether | 3.00 | 3.00 | 3.00 | 3.00 |
| LIPONIC ® EG-1 | 2.00 | 2.00 | 2.00 | 2.00 |
| CRODAFOS ™ N3 | 0.50 | 0.50 | 0.50 | 0.50 |
| SURFYNOL ® 440 | 0.25 | 0.25 | 0.25 | 0.25 |
| DYNOL ® 360 | 0.25 | 0.25 | 0.25 | 0.25 |
| LIQUILUBE ™ 405 Wax | 0.75 | 0.75 | 0.50 | 0.50 |
| PU | 5.00 | 5.00 | 3.50 | 3.50 |
| Styrene acrylate K pigment | 2.75 | 2.75 | — | — |
| Styrene acrylate C pigment | — | — | 2.25 | 2.25 |
| Water | 79.50 | 80.50 | 81.75 | 82.75 |
| Total | 100 | 100 | 100 | 100 |

*inks titrated to pH 8.5 using potassium hydroxide (KOH)

Example 2

As summarized in Table 2 below, sustained decap was measured for black and cyan inks using the compositions of Table 1. Sustained decap is a test to measure whether the pen can maintain good nozzle health without servicing for 15 minutes or minimal servicing for 15 minutes.

An electronics print system using an inkjet printhead and drum paper path were used to run the sustained decap test. A nozzle health check pattern, a beginning-of-test decap plot, and warm-up bars were printed to check for valid starting conditions. The drum was then spun at 84 ips. The printhead printed a minimal servicing routine for 15 minutes. The minimal servicing routine printed a spit-on-page pattern such that each nozzle jetted 8 times a second. The timing that each nozzle jetted for spit-on-page was distributed to minimize visual detection and patterning. An end-of-test decap plot was then printed to evaluate the performance of sustained decap.

The sustained decap grade was the first line to have good line quality (e.g., optical density and/or displacement). For example, if the 5th printed plot line had good quality (i.e., lines 1-4 did not have good quality), the sustained decap grade was 5. These grades are summarized in Table 2 below.

The blanks in the glycerol rows for PU molecular weights of 40,000 g/mol and 46,000 g/mol in Table 2 below mean that these particular solvent/PU MW combinations were not tested.

TABLE 2

| Color | Co-solvent in ink vehicle | PU MW 25,000 g/mol | PU MW 39,000 g/mol | PU MW 40,000 g/mol | PU MW 46,000 g/mol |
|---|---|---|---|---|---|
| K | Glycerol | 2 | 2 | — | — |
|   | Tetraethylene glycol | fail | fail | fail | fail |
| C | Glycerol | 2 | 2 | — | — |
|   | Tetraethylene glycol | 3 | 4 | fail | fail |

*Grade Range 1-16: 1 = best; 16 = fail

As can be seen in Table 2 above, the compositions containing glycerol demonstrated excellent sustained decap performances (e.g., grades 2, 3, and 4) when compared with compositions containing other solvent (e.g., tetraethylene glycol; grade of 16 means that those compositions failed sustained decap tests). The black and cyan inks containing tetraethylene glycol failed sustained decap while black and cyan inks containing glycerol exhibited good sustained decap performance.

As demonstrated in the examples above, the inkjet ink compositions described herein exhibit improved ink stability, increased pen life, and both short-term and sustained decap performance because of the use of glycerol.

Without wishing to be bound by theory, it is believed that glycerol performed surprisingly better due to the humectant (water-capturing) properties of glycerol, which can keep an ink/binder layer "wet" and soft. A wetter and softer ink film on the nozzle plate upon printing is less likely to create nozzle obstructions or crusts on the nozzle plate, which can translate to much improved sustained decap performance. Glycerol therefore can enable improved sustained decap performance for inkjet inks, making these inks increasingly commercially useful.

The use of glycerol to improve sustained decap performance can be useful for several reasons. First, the use of glycerol as described herein does not result in a need to increase solvent amount in the inkjet inks. Therefore, these inks can have good drying times, no increase in volatile organic compounds (VOCs) content, and potentially improved durability compared with inkjet inks that can include higher solvent amounts for certain sustained decap performance results.

Second, the inkjet inks described herein can improve durability of the printed images relative to other "binder-reduced" inks created in an effort to improve sustained decap performance, because the binder amount in the present inkjet inks can be maintained. Generally, to improve sustained decap performance can lead to reduction in binder amounts, which can then result in less durable printed images. This may not be the case with the glycerol containing inkjet inks described herein.

Third, the inkjet inks described herein can result in higher press speed, productivity, and suitability for the packaging market(s), because these inks do not result in excessive servicing or press interference as a result of good sustained decap performance demonstrated above.

Finally, the inkjet inks described herein can improve overall print quality because these inks do not have to use of the "spit on page" (SOP) servicing method to keep nozzles healthy and as a result no "stray dots" may be formed on the paper/media.

While several examples have been described in detail, it is to be understood that the disclosed examples may be modified. Therefore, the foregoing description is to be considered non-limiting.

What is claimed is:

1. An inkjet ink composition comprising:
   a colorant;
   a solvent comprising glycerol in an amount of from about 1 wt % to about 20 wt % based on the total weight of the inkjet ink composition;
   water; and
   a binder comprising a polyurethane-based binder dispersion including water and a polyurethane, the polyurethane comprising:
   (A) polyisocyanate,
   (B) a first polyol having a chain with two hydroxyl functional groups at one end of the chain and no hydroxyl groups at an opposed end of the chain,
   (C) a second polyol having a chain with two hydroxyl functional groups at both ends of the chain,
   (D) a carboxylic acid functional group that further includes two hydroxyl functional groups, and
   (E) a sulfonate or sulfonic acid functional group that further includes two amino functional groups.

2. The inkjet ink composition of claim 1, wherein the glycerol is present in an amount of from about 3 wt % to about 12 wt % based on the total weight of the inkjet ink composition.

3. The inkjet ink composition of claim 1, wherein the colorant is a black pigment, a cyan pigment, a magenta pigment, or mixtures thereof, and wherein the colorant is dispersed in a dispersion comprising a styrene acrylic polymer.

4. The inkjet ink composition of claim 1, wherein the colorant is a black pigment or a cyan pigment dispersed in a dispersion comprising a styrene acrylic polymer.

5. The inkjet ink composition of claim 1, wherein (A) is isophorone diisocyanate (IPDI), 2,2,4-trimethyl-hexamethylene-diisocyanate (TMDI), dicyclohexylmethane-4,4-diisocyanate (H12MDI), hexamethylene-1,6-diisocyanate (HDI), or mixtures thereof.

6. The inkjet ink composition of claim 1, wherein (B) is formed from a free radical polymerization of a monomer in the presence of a mercaptan including two hydroxyl functional groups or two carboxylic functional groups;
the monomer is selected from the group consisting of an alkylester of acrylic acid, an alkylester of methacrylic acid, an acid group containing monomer, acrylamide, an acrylamide derivative, methacrylamide, a methacrylamide derivative, styrene, a styrene derivative, acrylonitrile, vinylidene chloride, a fluorine containing acrylate, a fluorine containing methacrylate, a siloxane containing acrylate, a siloxane containing methacrylate, vinyl acetate, N-vinylpyrrolidone, and combinations thereof; and
the mercaptan is selected from the group consisting of 1,2-propanediol (thioglycerol), 1-mercapto-1,1-ethanediol, 2-mercapto-1,3-propanediol, 2-mercapto-2-methyl-1,3-propanediol, 2-mercapto-2-ethyl-1,3-propanediol, 1-mercapto-2,3-propanediol, 2-mercaptoethyl-2-methyl-1,3-propanediol, and thioglycolic acid.

7. The inkjet ink composition of claim 1, wherein (C) is poly(propyleneglycol), poly(tetrahydrofuran), poly(carbonate) polyol, or mixtures thereof.

8. The inkjet ink composition of claim 1, wherein (D) is dimethylolpropionic acid (DMPA), dimethylol butanoic acid (DMBA), or mixtures thereof.

9. The inkjet ink composition of claim 1, wherein (E) is ethyldiamineethylsulfonic acid or a salt thereof, ethyldiaminepropylsulfonic acid or a salt thereof, 5-amino-2-(aminomethyl)-1-pentanesulfonic acid or a salt thereof, 2,3-diamino-1-propanesulfonic acid or a salt thereof, 3-[bis(2-aminoethyl)aminol-1-propanesulfonic acid or a salt thereof, 2-[bis(2-aminoethyl)amino]-ethanesulfonic acid or a salt thereof, 2-[(2-aminoethyl)amino]-1-propanesulfonic acid or a salt thereof, 2 [[2-[(1-methylethy)amino]ethyl]amino]-ethanesulfonic acid or a salt thereof, 2-[(2-aminoethyl)amino]-1-pentanesulfonic acid or a salt thereof, or mixtures thereof.

10. The inkjet ink composition of claim 1, wherein
   (A) is isophorone diisocyanate, which is present in the polyurethane in an amount of from about 24 wt % to about 30 wt % based on the total weight of the polyurethane,
   (B) is a copolymer of methyl methacrylate-co-ethylhexylacrylate-co-ethoxyethoxyethylacrylate with two hydroxy groups at one end, which is present in the polyurethane in an amount of from about 40 wt % to about 50 wt % based on the total weight of the polyurethane, wherein (B) the copolymer comprises about 75 wt % of methyl methacrylate, about 15 wt % of ethylhexylacrylate, and about 10 wt % of ethoxyethoxyethylacrylate, each based on the total weight of (B),
   (C) is polypropylene glycol with a $M_n$ of 1000 g/mol, which is present in the polyurethane in an amount of from about 12 wt % to about 18 wt % based on the total weight of the polyurethane,
   (D) is dimethylolpropionic acid, which is present in the polyurethane in an amount of from about 2 wt % to about 6 wt % based on the total weight of the polyurethane, and
   (E) is sodium 2-[(2-aminoethyl)amino]ethanesulphonate, which is present in the polyurethane in an amount of from about 8 wt % to about 12 wt % based on the total weight of the polyurethane.

11. The inkjet ink composition of claim 1, wherein the colorant is present in an amount of from about 1 wt % to about 8 wt % based on the total weight of the inkjet ink composition.

12. A method of making the inkjet ink composition of claim 1 comprising:

mixing the colorant; the solvent comprising the glycerol; the water; and the binder, to form the inkjet ink composition.

13. A method of using the inkjet ink composition of claim 1 comprising:
    applying the inkjet ink composition of claim 1 to a media substrate.

14. Art ink set comprising:
    (i) a black ink comprising:
        water,
        a solvent comprising glycerol in an amount of from about 3 wt % to about 12 wt % based on the total weight of the inkjet ink composition;
        a black pigment in a polymeric dispersion, wherein the polymeric dispersion comprises a styrene acrylic polymer, and
        a binder, wherein the binder comprises a polyurethane-based binder dispersion, which comprises water and a polyurethane, wherein the polyurethane comprises:
            (A) a polyisocyanate,
            (B) a first polyol having a chain with two hydroxyl functional groups at one end of the chain and no hydroxyl groups at an opposed end of the chain,
            (C) a second polyol having a chain with two hydroxyl functional groups at both ends of the chain,
            (D) a carboxylic acid functional group that further includes two hydroxyl functional groups, and
            (E) a sulfonate or sulfonic acid functional group that further includes two amino functional groups; and
    (ii) a cyan ink comprising:
        water,
        a solvent comprising glycerol in an amount of from about 3 wt % to about 12 wt % based on the total weight of the inkjet ink composition;
        a cyan pigment in a polymeric dispersion, wherein the polymeric dispersion comprises a styrene acrylic polymer, and
        a binder, wherein the binder comprises a polyurethane-based binder dispersion, which comprises water and a polyurethane, wherein the polyurethane comprises:
            (A) a polyisocyanate,
            (B) a first polyol having a chain with two hydroxyl functional groups at one end of the chain and no hydroxyl groups at an opposed end of the chain,
            (C) a second polyol having a chain with two hydroxyl functional groups at both ends of the chain,
            (D) a carboxylic acid functional group further includes two hydroxyl functional groups, and
            (E) a sulfonate or sulfonic acid functional group that further includes two amino functional groups.

* * * * *